July 11, 1967  D. L. GRIEB ETAL  3,330,080
ARCUATE PANEL ROOF CONSTRUCTION
Filed Jan. 6, 1964
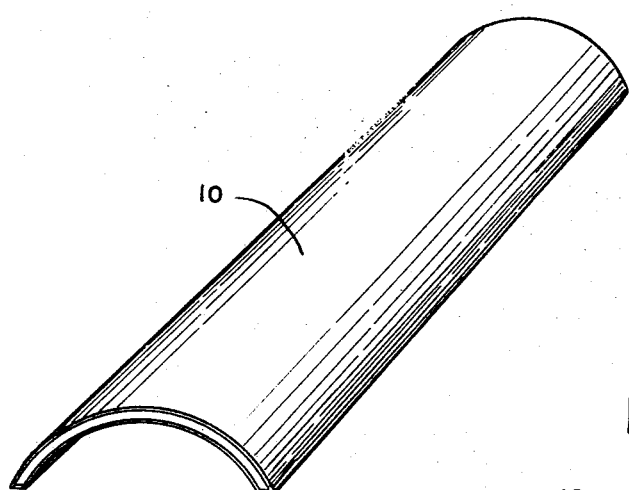
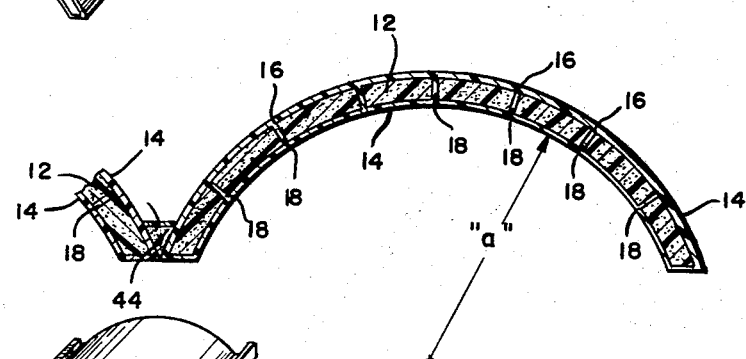
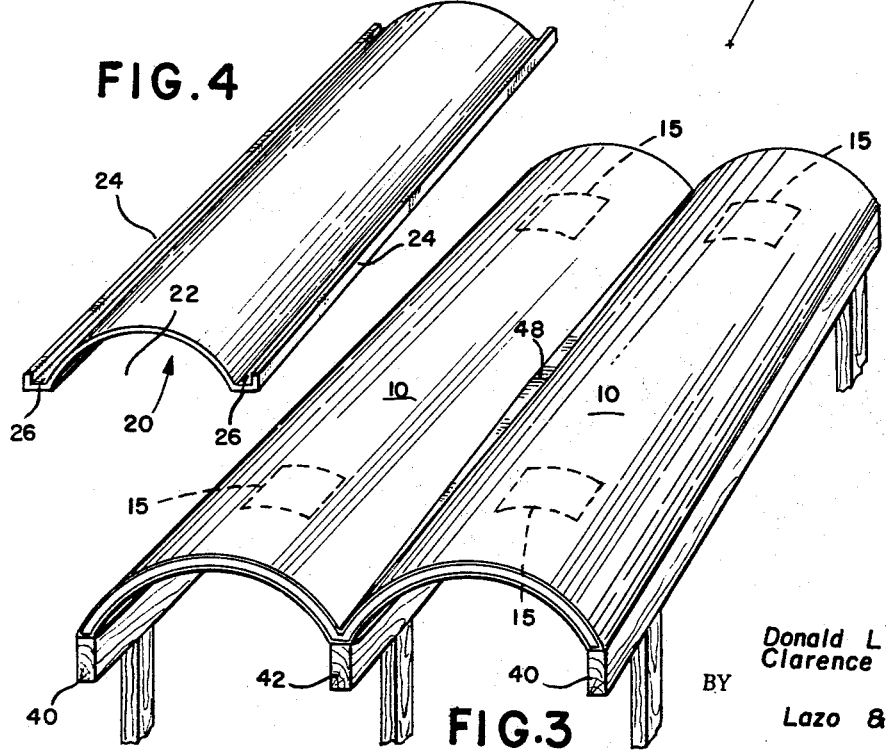
INVENTORS
Donald L. Grieb and
Clarence O. Wahner
BY
Lazo & Barry
Attorneys United States Patent Office 3,330,080
Patented July 11, 1967

3,330,080
ARCUATE PANEL ROOF CONSTRUCTION
Donald L. Grieb, 8135 N. River Road 53217, and
Clarence O. Wahner, 5431 W. County Line Road
53223, both of Milwaukee, Wis.
Filed Jan. 6, 1964, Ser. No. 335,779
5 Claims. (Cl. 52—86)

This invention relates to building panels fabricated from plastic materials and more particularly to self-supporting structures and the method of making such structures.

The building industry is rapidly recognizing the qualities of laminated plastic materials as building materials. Flat panels of expanded plastic material have been covered with various types of resinous materials and used for the walls and roofs of various types of structures. These panels have been used primarily for insulating purposes only. When a flat panel has been used in a roof structure, the panel must be supported by a truss element since the panel lacks sufficient strength to support itself. Up to the present time there has been very little activity toward the use of a laminated plastic building panel as a self-supporting structure.

One of the primary objects of this invention is to provide a building panel that is completely self-supporting whether mounted horizontally or vertically.

Another object of the present invention is to provide a building panel that can withstand all kinds of weather conditions.

Another object of the present invention is to provide a building panel that can be used both as a wall board and as a roof board.

Still another object of the present invention is to provide a prefabricated building panel which can be used primarily as a structural element and also as a light-transmitting medium.

A further object of the present invention is to provide a building panel that is easy to manufacture, low in cost, and light in weight.

A still further object of the present invention is to provide a building panel that has a permanent finish whether smooth or textured, colored or clear.

A further object is to provide a method of making an arched structure that can be used as a structural building element.

These objects are accomplished by combining the insulating properties of polyurethane with the strength characteristics of fiber glass resin compositions in such a manner that a completely self-supporting structural panel is produced. The panel is made by bending a flat board of polyurethane to a desired curvature. The inner and outer surfaces of the polyurethane are coated with a thin layer of fiber glass resin composition. Since a flat board of polyurethane which has been arched or curved has a strong tendency to assume its original flat shape, a structural tie may be made between the inner and outer layers of the fiber glass resin composition to hold the panel at the desired curvature. This is done by piercing the polyurethane with a number of holes at predetermined intervals and filling the holes with the fiber glass resin composition. When the resin composition is coated on the surfaces of the polyurethane, it will chemically bond with the fiber glass resin in the holes. A rigid mechanical interconnection is thereby made between the two surface coatings which will maintain the curved configuration of the panel.

One of the advantages of using an arched panel made according to this invention is the inherent strength a curved structure has to forces applied to its outer curved surface. The panel has sufficient strength to be used for many other purposes other than building structures, such as foot bridges, retaining walls, roof ventilators, etc.

Other objects and advantages will become more readily apparent when the following detailed description is read in connection with the accompanying drawings in which:

FIG. 1 is a view of a single panel.
FIG. 2 is a view in cross section of a single panel showing the column connection between the inner and outer surfaces.
FIG. 3 is a view of two panels joined together as a roof structure with a sloped connector between the roof panels.
FIG. 4 is a view of a light-transmitting panel having reinforcing means embedded therein.

Referring more particularly to the drawings, a panel 10 is shown having a radius of curvature "a." The core 12 of the panel is made from a number of boards of polyurethane which have been bent and covered on the inner and outer surfaces with a thin layer of fiber glass resin composition 14. If sufficient fiber glass resin composition is applied, the panel will stay curved under minimum loads. In order to increase the strength of the panel and reduce the amount of fiber glass resin composition used, a number of holes 16 are pierced through the core and are filled with the fiber glass resin composition as described below to form columns 18 which interconnect the inner and outer layers of fiber glass resin composition. These columns establish a rigid connection between the inner and outer layers which hold the panel in the curved position.

The core is made from a foamed polyurethane board or sheet which is placed in a mold. Polyurethane was selected because of its light weight and low coefficient of heat transfer, having a K factor of approximately 0.17. A sheet two inches thick has been used for home building uses, but this thickness can be varied according to the temperature conditions of the community where the panel is to be used. This material is normally supplied in flat sheet or board form and has an inherent flexibility which makes it possible to bend the sheet to fit in a mold. When the boards are bent into the mold, they must be held in the curved position until the surfaces of the board are completely covered with the fiber glass resin composition and the resin is allowed sufficient time to set. If a long panel is to be made, a number of the boards are placed side by side in the mold.

The fiber glass resin composition used includes a fire resistant polyester resin composition such as Hetron 354 sold by Durez Plastic, a division of Hooker Chemical Corporation. This resin is sprayed onto the surfaces of the polyurethane simultaneously with the application of a fiber glass roving. A thickness of ⅛" to ¼" is all that is required for this panel, because of the inclusion of a number of columns 18 to interconnect the inner and outer layers of the fiber glass resin composition.

In order to fabricate panels as disclosed here, a definite procedure must be followed. Referring to FIG. 4, a mold 20 is shown having an arched center section 22 and flanges 24 along both sides which form grooves 26. The surface of the mold can be textured if desired for different inside wall effects without affecting the characteristics of the panel. The selection of the material for making the mold must have a low coefficient of expansion to compensate for the heat created by the chemical reaction of the fiber glass resin composition setting. Aluminum was used for making the surfaces of the mold and was supported by wood braces, but any material having similar characteristics could also be used.

The surface of the mold must be coated with a release agent in order to allow for the removal of the panel after it has been completed. At the present time, twelve coats of wax are rubbed by hand onto the surface of the mold. A coat of water soluble wax, preferably Part All No. 10, made by Glidden, is sprayed over the waxed surface.

A coating of fiber glass resin composition is then sprayed thereon to a thickness of a nominal 1/8". While the fiber glass resin composition is still liquid, a number of boards or sheets of polyurethane are placed side by side on the sprayed surface of the mold with the ends of the boards pushed into grooves 26. The flanges 24 will hold the board tightly against the fiber glass resin composition. A two-inch thick board is being used at the present time, but the thickness can be varied according to the design requirements. Metal bands may be used to hold the sheet of polyurethane in position if flanged locking edges are not provided on the mold.

The polyurethane panels are provided with holes approximately 3/8" to 1/2" in diameter according to a predetermined grid design. The grid design is chosen to provide the required structural strength with a minimum loss of core material. In the panels presently being used, the holes are spaced approximately 9 to 12 inches apart. In fabricating the panels, the holes in the core material are first partially filled with uncut fiber glass roving and then completely filled with polyester resin material of the same type as used in the fiber glass resin composition.

An outer coat of fiber glass resin composition is sprayed over the outer surface of the polyurethane board to a thickness of 1/8" to 1/4". The columns thus form a solid fiber glass resin composition connection between the inner and outer surfaces of the panel.

The water soluble wax is sprayed over the surface of the panel to aid in setting the fiber glass resin composition.

With this method of manufacture, panels of a wide range of sizes can be made. The panel which has been used for a roof structure is twenty-eight feet long and seven feet across with a seven foot radius of curvature. Seven of the finished panels were used in the roof, providing a 49 by 28 foot surface with each panel having a nominal weight of 500 pounds.

In FIG. 3, an example is shown for making a roof structure. Panels 10 are mounted on longitudinal beams 40. A center beam 42 is shown but can be eliminated if desired. The edges of the panels are joined by placing a strip of polyurethane 44 in the space between the panels and spraying a coat 46 of fiber glass resin composition on the strip of polyurethane. A high point 48 is provided in the center of the strip to allow for the flow of water toward the outer edges of the roof. If the center beam is omitted, the seam should be joined on the inside as well as the outside.

Where the panel is used as a building structure, clear or transparent members 15 (shown dotted in FIG. 3) may be mounted on the sheet of polyurethane and covered with a clear fiber glass resin composition. These members allow light to pass through the panel producing a lighting effect within the building. A twelve inch by twelve inch member has been found to be adequate for this purpose, but any size member could be used.

Although a number of modifications of the building panel have been shown and described, it should be understood that various changes and modifications can be made without departing from the scope of the appended claims.

What is claimed is:
1. A ceiling structure comprising
   a core of expanded polyurethane material bent to a predetermined radius of curvature,
   said core having compressive and tensile stresses on its inner and outer surfaces, respectively,
   a layer of fiber glass resin on the inner and outer surfaces, of said core,
   a number of fiber glass resin columns interconnecting the layers of fiber glass on the inner and outer surfaces of said core to maintain its radius of curvature against the stresses set up in the core,
   and a support structure engaging the longitudinal edges of the arches.
2. A ceiling structure according to claim 1, wherein said core includes
   means for allowing the transmission of light through said arches.
3. A roof structure comprising
   a number of longitudinally extending arches having a core of polyurethane bent to a predetermined radius of curvature and having compression and tensile stresses on its inner and outer surfaces, said cores being covered with a fiber glass resin composition on its inner and outer surfaces to maintain the curvature of the core in its stressed condition,
   said arches being placed in a side by side relation,
   means for connecting the seam between said arches to form an integral structure, and
   support means engaging the longitudinal edges of said structure.
4. A roof structure according to claim 3 wherein the inner and outer surfaces of fiber glass resin composition are interconnected through said core by a number of fiber glass resin composition columns.
5. A roof structure according to claim 4 wherein said arches include means for allowing the transmission of light through said cores.

References Cited

UNITED STATES PATENTS

| 1,400,078 | 12/1921 | Kemptow | 52—309 X |
| 2,311,613 | 2/1943 | Slayter | 52—309 X |
| 2,376,653 | 5/1945 | Boyer | 52—309 X |
| 2,689,197 | 9/1954 | Gerlich | 52—309 X |
| 2,887,732 | 5/1959 | Kloote et al. | 52—309 X |
| 2,969,618 | 1/1961 | Ratner et al. | 52—309 X |
| 3,041,195 | 6/1962 | Saewert | 117—62.2 X |
| 3,068,007 | 12/1962 | Satchell | 264—129 X |
| 3,135,625 | 6/1964 | Ingrassia | 117—62.2 |
| 3,232,017 | 2/1966 | Prusinski et al. | 52—309 |

FOREIGN PATENTS 746,009  3/1956  Great Britain.

FRANK L. ABBOTT, *Primary Examiner.*

R. S. VERMUT, *Assistant Examiner.*